United States Patent
Wong et al.

(10) Patent No.: US 7,911,934 B2
(45) Date of Patent: Mar. 22, 2011

(54) RESOURCE ALLOCATION IN MULTI DATA STREAM COMMUNICATION LINK

(75) Inventors: Ian C. Wong, Austin, TX (US);
Oghenekome F. Oteri, Austin, TX (US);
James W. McCoy, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 983 days.

(21) Appl. No.: 11/541,710

(22) Filed: Oct. 2, 2006

(65) Prior Publication Data

US 2008/0080545 A1 Apr. 3, 2008

(51) Int. Cl.
*H04J 11/00* (2006.01)
(52) U.S. Cl. ........................................... 370/203
(58) Field of Classification Search .......... 370/203–211, 370/310, 328, 431, 437, 464, 465; 709/227–230
See application file for complete search history.

(56) References Cited

U.S. PATENT DOCUMENTS

| | | | |
|---|---|---|---|
| 6,628,949 B1* | 9/2003 | Park | 455/436 |
| 2003/0125040 A1* | 7/2003 | Walton et al. | 455/454 |
| 2007/0004465 A1* | 1/2007 | Papasakellariou et al. | 455/571 |
| 2007/0025266 A1* | 2/2007 | Riedel et al. | 370/252 |

OTHER PUBLICATIONS

Raphael Cendrillon, et al., "Optimal Multiuser Spectrum Balancing for Digital Subscriber Lines", IEEE Transactions on Communications. vol. 54, No. 5, May 2006 pp. 922-933.
Wei Yu and Raymond Lui, "Dual Methods for Nonconvex Spectrum Optimization of Multicarrier Systems", IEEE Transactions on Commuications, vol. 54 No. 7, Jul. 2006, pp. 1310-1322.
Sameh Najeh, et al., "Greedy Algorithm for Dynamic Resource Allocation in Downlink of OFDMA System", 0-7803-9206/05 IEEE 2005 pp. 475-479.
Kibeom Seong, et al., "Optimal Resource Allocation for OFDMA Downlink Systems".
Qian Wang, "Reverse Link Scheduling and Data Rate Allocation Scheme for CDMA2000 1xEV-DV: An Alternative Approach", Nov. 2005, pp. 1-87.

* cited by examiner

*Primary Examiner* — Dmitry H Levitan

(57) ABSTRACT

Methods and corresponding systems for allocating resources in a communications system includes determining feasible sets of subchannels for allocation to a user subject to an allocation constraint. In one approach, a constraint matrix representing constraints for allocating subchannels to users in allocations of selected subchannels is computed, subject to the allocation constraint. Then a vector containing metrics corresponding to allocations of selected subchannels to the communication links is estimated. A binary decision vector representing an allocation of the subchannels to the users is computed using binary integer processing. In another approach a greedy heuristic allocation is used. The allocation constraint can be a restriction limiting multiple subchannels allocated to a user to be adjacent to one another. The metrics can be weighted capacities of allocations of selected subchannels to the users.

8 Claims, 3 Drawing Sheets

$$A_m = \begin{bmatrix} 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 1 & 1 & 0 & 0 \\ 0 & 1 & 1 & 0 \\ 0 & 0 & 1 & 1 \\ 1 & 1 & 1 & 0 \\ 0 & 1 & 1 & 1 \\ 1 & 1 & 1 & 1 \end{bmatrix}, \forall m \in M$$

FIG. 3

$$A = \begin{bmatrix} \begin{bmatrix} 0 & 1 & 0 & 0 & 0 & 1 & 0 & 0 & 1 & 0 & 1 \\ 0 & 0 & 1 & 0 & 0 & 1 & 1 & 0 & 1 & 1 & 1 \\ 0 & 0 & 0 & 1 & 0 & 0 & 1 & 1 & 1 & 1 & 1 \\ 0 & 0 & 0 & 0 & 1 & 0 & 0 & 1 & 0 & 1 & 1 \end{bmatrix} & \begin{bmatrix} 0 & 1 & 0 & 0 & 0 & 1 & 0 & 0 & 1 & 0 & 1 \\ 0 & 0 & 1 & 0 & 0 & 1 & 1 & 0 & 1 & 1 & 1 \\ 0 & 0 & 0 & 1 & 0 & 0 & 1 & 1 & 1 & 1 & 1 \\ 0 & 0 & 0 & 0 & 1 & 0 & 0 & 1 & 0 & 1 & 1 \end{bmatrix} \\ \begin{bmatrix} 1 & 1 & 1 & 1 & 1 & 1 & 1 & 1 & 1 & 1 & 1 \\ 0 & 0 & 0 & 0 & 0 & 0 & 0 & 0 & 0 & 0 & 0 \end{bmatrix} & \begin{bmatrix} 0 & 0 & 0 & 0 & 0 & 0 & 0 & 0 & 0 & 0 & 0 \\ 1 & 1 & 1 & 1 & 1 & 1 & 1 & 1 & 1 & 1 & 1 \end{bmatrix} \end{bmatrix}$$

FIG. 4

$$c = \begin{bmatrix} c_{1,1} \\ c_{1,2} \\ \vdots \\ c_{1,j} \\ c_{2,1} \\ c_{2,2} \\ \vdots \\ c_{2,j} \\ c_{m,1} \\ c_{m,2} \\ \vdots \\ c_{m,j} \end{bmatrix}$$

FIG. 5

$$x = \begin{bmatrix} x_{1,1} \\ x_{1,2} \\ \vdots \\ x_{1,j} \\ x_{2,1} \\ x_{2,2} \\ \vdots \\ x_{2,j} \\ x_{m,1} \\ x_{m,2} \\ \vdots \\ x_{m,j} \end{bmatrix}$$

FIG. 6

RESOURCE ALLOCATION IN MULTI DATA STREAM COMMUNICATION LINK

FIELD OF THE INVENTION

This invention relates in general to communication systems having multiple data streams using an allocated set of communication system resources, and more specifically to techniques and apparatus for efficiently allocating sets of subchannels.

BACKGROUND OF THE INVENTION

In some communications systems, such as the communications system known as 3rd Generation Partnership Project-Long Term Evolution (3GPP-LTE), there are communication system resources, such as subchannels, that can be allocated to one or more users for simultaneous multiplexed transmission on an uplink communication link to a base station or other similar communication device. In order to obtain certain desired signal characteristics, the communications system, e.g., in terms of an air interface specification, may require or place certain constraints on uplink transmissions from users.

In a wireless communications system, channel conditions can vary from user-to-user, and from one subchannel to another for the same user. Therefore, there may be combinations of channel resource allocations to particular users that impact communication system efficiency as measured by metrics such as transmit power and effective bit rates. Additionally, concepts of fairness in allocating communication resources to facilitate service to all users, ensure that system efficiency is not the only goal considered in allocating communication resources.

Therefore, the problem of allocating communication resources to users can become quite complex when considering fairness, system efficiency, and allocation rules and constraints in the process of allocating, for example, sets of subchannels to users. By one estimate, in a system with 24 subchannels allocated among 10 users, computing the impact on system efficiency or capacity for each possible user/subchannel allocation would require on the order of 23 billion operations.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

FIG. 3 depicts a matrix of communication resource allocation patterns embodying allocation constraints for each user in accordance with one or more embodiments;

FIG. 4 depicts a matrix of communication resource allocation patterns and allocation and exclusivity constraints for all users in accordance with one or more embodiments;

FIG. 5 depicts a reward vector in accordance with one or more embodiments;

FIG. 6 depicts a decision vector in accordance with one or more embodiments;

DETAILED DESCRIPTION

In overview, the present disclosure concerns allocation of communication system resources to a plurality of users (or a single user transmitting a plurality of data streams, or some combination of users and data streams). More particularly, various inventive concepts and principles embodied in methods and apparatus may be used for allocating selected subchannel resources to users in a communication system in accordance with a quality of such subchannels and constraints or restrictions on the allocation of such subchannels.

While the communication system resource allocation of particular interest may vary widely, one embodiment may advantageously be used in a wireless cellular communications system having devices using a transmitter and receiver that implement a single carrier frequency division multiple access (SC-FDMA) modulation scheme. However, the inventive concepts and principles taught herein may be advantageously applied to other broadband communications systems having multiplexed communication links wherein streams of data are transmitted in other media, such as a twisted copper pair, or a coaxial cable, or other similar media.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles are best implemented with, or in, integrated circuits (ICs), including possibly application specific ICs, or ICs with integrated processing controlled by embedded software or firmware. It is expected that one of ordinary skill—notwithstanding possibly significant effort and many design choices motivated by, for example, available time, current technology, and economic considerations—when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
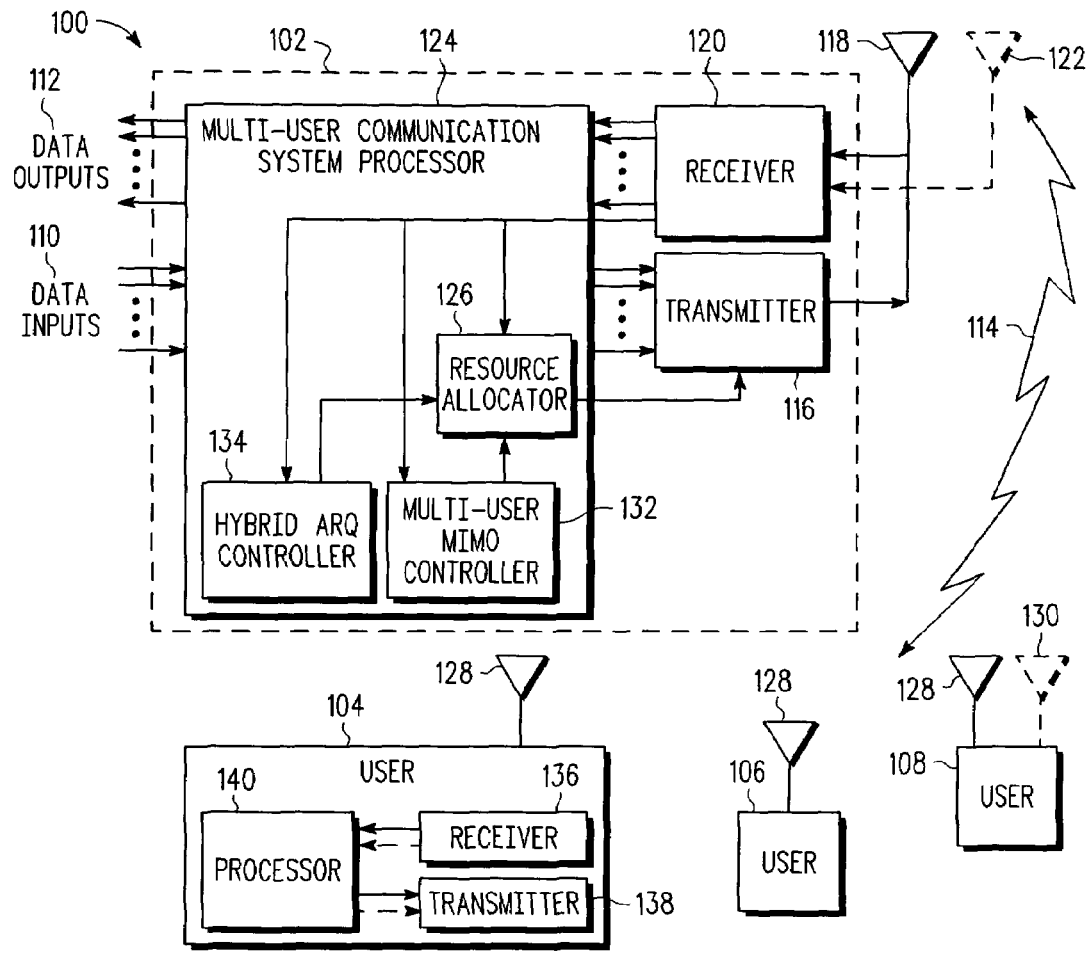
FIG. 1 depicts, in a simplified and representative form, a high-level block diagram of portions of a data communication system having a multiple stream, or multi-user, communication link in accordance with one or more embodiments.

Referring to FIG. 1, a high-level diagram of portions of a data communications system in accordance with one or more embodiments will be briefly discussed and described. In FIG.

1, communications system 100 includes a multi-user or multi-stream transceiver 102 for sending and receiving multiple data streams to and from another communication device or devices, such as user devices 104, 106, and 108. A multi-user transceiver can transmit data to, and receive data from, a plurality of user devices in the communications system. An example of transmitting multiple streams of data can include the simultaneous or contemporaneous transmission of voice data and video data, or other types of data files.

Data transmitted by multi-user transceiver 102 can be received at data inputs 110, and data received by multi-user transceiver 102 can be output at data outputs 112. Such data transferred between the transceiver and the user devices can be separated or distinguished by user, or by application data sessions, or by different data types intended for different uses at different destinations.

In one embodiment, the multi-user communication system can be a base station in a wireless communication system, wherein the base station sends and receives data to and from a plurality of user devices. In such a wireless system, user devices 104, 106, and 108 can be wireless devices, which can be mobile devices that send and receive radio frequency (RF) signals 114. An example of such a wireless system is the wireless system known as a single-carrier frequency division multiple access (SC-FDMA) system, which is more completely described in a specification known as the 3rd Generation Partnership Project (3GPP) Long Term Evolution (3GPP-LTE), or another similar multi-tone communication system. The 3GPP-LTE specification is published by The European Telecommunications Standards Institute (ETSI) in Sophia Antipolis, France.

In another embodiment, multi-user communication system 100 can be a wireline multi-tone communication system, which can include, for example, a transmitter or a transceiver for a cable television network, wherein a cable head end transceiver transmits and receives signals from cable modems.

Multi-user transceiver 102 includes transmitter 116, which is capable of transmitting a multi-user (or a multi-stream) signal to one or more user devices 104, 106, and 108, where such multiple signals are represented by multiple inputs, e.g., baseband inputs, to transmitter 116. In a wireless embodiment, transmitter 116 can be coupled to antenna 118 for transmitting signal 114.

Multi-user transceiver 102 also includes receiver 120 for receiving a multi-user (or a multi-stream) signal 114 (composite of uplink signals transmitted by active user devices, e.g., 104-106), represented by multiple outputs from receiver 120, which can be received using antenna 118.

Receiver 120 and transmitter 116 are coupled to multi-user communications system processor 124 for processing a plurality of baseband data streams received from and transmitted to users 104, 106, and 108. Processor 124 is also coupled to data inputs 110 and data outputs 112 for inputting and outputting data to and from multi-user transceiver 102. Processor 124 is responsible for processing user data, and managing and controlling transmitter 116 and receiver 120. Processor 124 can handle coding, error detection and correction, and other overhead operations, including communication resource allocation.

As a part of multi-user communications system processor 124, resource allocator 126 receives input data and efficiently allocates communication resources to the plurality of users 104, 106, and 108. Resource allocator 126 can be coupled to receiver 120 for receiving one or more requests for communications resource allocation, which can include, in one embodiment, a request for subchannel allocation for uplink transmissions in a 3GPP-LTE communication system.

Resource allocator 124 can also receive channel conditions 210, such as metrics or measurements related to channel performance of channels between multi-user transceiver 102 and users 104, 106, and 108. In one or more embodiments, resource allocator 124 uses such information to schedule and strategically allocate communication resources for uplink transmissions from users 104, 106, and 108.

In an SC-FDMA system embodiment, resource allocator 124 schedules and allocates subchannels and powers that are used by users 104, 106, and 108 in transmitting an uplink signal (e.g., an uplink portion of RF signal 114). The allocated subchannels, in one embodiment, each include 12 contiguous or adjacent subcarriers.

In an other embodiment, multi-user transceiver 102 can include a multiple-input multiple-output (MIMO) receiver system that adds an additional antenna 122 (shown with a dashed line in FIG. 1). For an uplink using multiple access MIMO, allocating subchannels can be done in a manner similar to the single antenna case, except that there are more subchannels to be allocated. For example, if there are $N_a$ allocations in the single antenna case, there will be $N_a+N_a$ allocations in the uplink multiple access MIMO 2×2 system. In a MIMO system, a user device can have multiple antennas, such as user 108, which has 2 antennas: 128 and 130.

Multi-user MIMO controller 132, for use in a MIMO system, can be coupled to receiver 124 for receiving channel condition data, and can be coupled to resource allocator 126 for sending MIMO channel condition data that can be used by resource allocator 126 for allocating subchannels.

Hybrid Automatic Repeat-reQuest (H-ARQ) is an error control mechanism by which retransmissions of failed packets are scheduled in the transmitter and processed or recombined in the receiver. Multi-user communication system processor 124 can include hybrid ARQ controller 134, which receives data input from receiver 120, and which outputs data to resource allocator 126. Hybrid ARQ controller 134 can be used to prompt resource allocator 126 to schedule, or reschedule, transmissions from selected users using the same communication resources as in an earlier transmission for synchronous H-ARQ, or different resources in the case of asynchronous H-ARQ.

As illustrated in detail at user 104, the user devices 104, 106, 108 can include receiver 136 and transmitter 138, which are each coupled to processor 140 and antenna 124. Receiver 136 can be used to receive one or more data streams from multi-user transceiver 102. Receiver 136 can additionally be used to receive a schedule of allocated subchannels or other resources. Transmitter 138 can be used to transmit one or more data streams to multi-user transceiver 102 using allocated subchannels, or other allocated communication resources.

Figure 2:
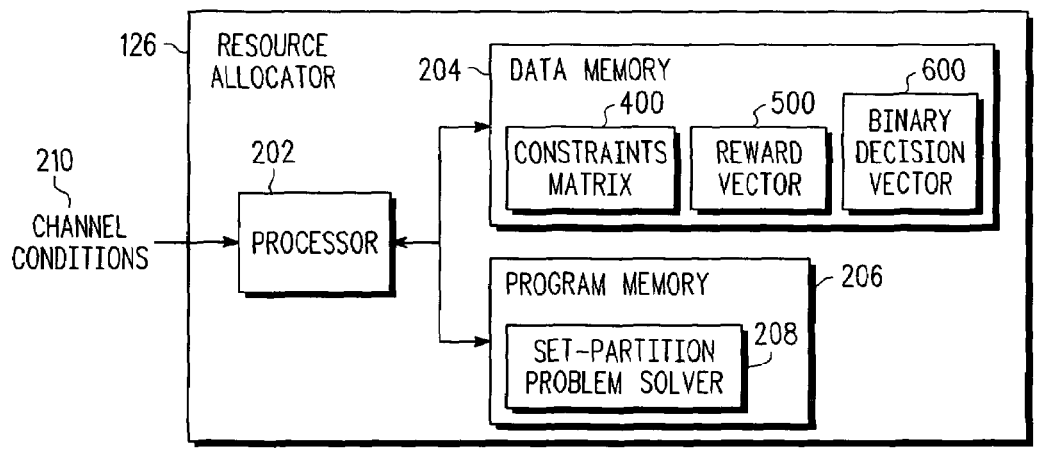
FIG. 2 shows, in a representative form, a more detailed block diagram of the resource allocator of FIG. 1 in accordance with one or more embodiments.

Referring to FIG. 2, there is depicted a representative block diagram of a resource allocator 126 in accordance with one or more embodiments. As shown, processor 202 can be coupled to data memory 204 and program memory 206. Processor 202 can be implemented with any one of several known microprocessors or microcontrollers. Data memory 204 can be used to store constraints matrix 400, reward matrix 500, and binary decision vector 600 (each of which is described in greater detail below), and other processing data or operational parameters.

Program memory 206 can contain programs, algorithms, or other software instructions that implement various functions or processes when executed within processor 202. For example, one such process is set-partitioning problem solver 208, and other similar program code, which can be implemented in software, firmware, hardware, or some combination thereof.

In the multi-user (or multi-stream) communications link described with reference to FIG. 1, transmissions from users are scheduled for particular times using particular communications resources. For example, transmissions from users 104, 106, and 108 on the uplink channel to multi-user transceiver 102 requires the scheduling of each user to transmit using a particular subchannel of the multiple subchannels that are available. Because channel conditions can vary for each subchannel assigned to a user, each user may transmit more or less efficiently using one subchannel or another, depending upon subchannel conditions for each user. With subchannel conditions varying between users, some subchannel allocations are more efficient than others, which means that the subchannels allocated to each user can be optimized or strategically selected by allocating a selected set of subchannels to a particular user based upon each subchannel condition for each user. Such subchannel conditions can include subchannel quality as measured by, for example, subchannel Shannon capacity, subchannel gain, a previously allocated bit rate, or other similar quantitative metrics that measure subchannel quality.

In some communication systems, multiple subchannels can be assigned to a user, wherein the subchannels can be selected anywhere in the entire bandwidth. However, in other communications systems (e.g., in the uplink channel for 3GPP-LTE SC-FDMA), users are normally assigned multiple subchannels that are adjacent to each other. This type of adjacency constraint can make the problem of scheduling subchannels for each user a much more difficult problem. The reason for the adjacency constraint is to reduce the peak-to-average power ratio of the transmit signal when pre-coded by a discrete Fourier transform (DFT) in the user's transmitter, which reduces some performance requirements and the expense of the user's transmitter.

In order to formulate the problem of allocating subchannels to users into a binary integer program, and more specifically, into a set-partitioning problem, consider a single sector of a multi-user wireless communications system using SC-FDMA. In the sector, M total users indexed by the set $M \triangleq \{1, \ldots, m, \ldots, M\}$, and the transmission bandwidth B is orthogonally subdivided into K subchannels indexed by $K \triangleq \{1, \ldots, k, \ldots, K\}$. The typical subchannel allocation restrictions in the SC-FDMA uplink are: exclusivity, which requires that at most one user be allocated to a single subchannel (but in MIMO systems, two users can be allocated to the same subchannel); and adjacency, which requires that a user can have multiple subchannel assignments only if they are adjacent to one another in transmission bandwidth B.

With regard to power allocation to the users, there are three restrictions: total power constraint, peak power constraint, and constant power allocation. The total power constraint requires that the power transmitted by each user should be less than some maximum power level $P_m$. The peak power constraint requires that the peak power transmitted by each user on each subchannel should be less than some peak power level $\hat{P}_{m,k}$. And the constant power allocation constraint requires that the power across multiple subchannels for a user should be constant.

The resource allocation problem determines the subchannel and power allocation that maximizes the total user-weighted system capacity, with user weights denoted by $w_m$, subject to each user's total power constraint $P_m$ and peak power constraint $\hat{P}_{m,k}$. The user weights can signify a user priority set up by upper layers of the communication system to enforce certain notions of fairness. For example, a proportional fairness allocation can be implemented with weights $w_m(n)=1/\bar{r}_m(n)$, where n is the time slot index and $\bar{r}_m(n)$ is the average rate for user m. The channel gain for user m in subchannel k is denoted as $\gamma_{m,k}$, and the ambient noise variance is denoted as $\sigma^2$.

As subchannels are assigned to users, $K_m$ denotes the set of subchannels assigned to user m. Because of the constant power allocation restriction, the power in each assigned subchannel $k \in K_m$ for user m is given as:

$$p_{m,k} = \begin{cases} \min\left(\frac{P_m}{|K_m|}, \hat{P}_{m,k}\right), & \forall k \in K_m \\ 0, & \forall k \notin K_m \end{cases} \quad (1)$$

where $|\cdot|$ denotes the cardinality of the set. Thus, the resource allocation problem, or the utilization problem, reduces to determining the subchannel allocations $K_m$ subject to the exclusivity constraint, which can be written as:

$$\max_{K_m \in K} \sum_{m \in M} w_m \sum_{k \in K_m} \log_2\left(1 + \min\left(\frac{P_m}{|K_m|}, \hat{P}_{m,k}\right)\frac{\gamma_{m,k}}{\sigma^2}\right) \quad (2)$$

$$\text{s.t. } K_m \cap K_{m'} = \emptyset,$$
$$\forall m \neq m',$$
$$m, m' \in M$$

where K is the set of all possible subchannel allocations that obey the adjacency constraint.

Note that equation (1) is a combinatorial optimization problem and is NP-complete. Solving this problem via brute force exhaustive searching for M users and K subchannels would require testing $$\sum_{m=1}^{M} m! P(K, m)$$

possible subchannel allocation combinations, where m!=m(m−1)(m−2) . . . 1 is the factorial function and P(K,m) is the constrained integer partition function, which denotes the number of ways an integer K can be written as the sum of exactly m addends. And since each possible subchannel allocation requires O(M+K) operations to compute the capacity, the overall complexity would be in the order of $$O\left((M+K)\sum_{m=1}^{M} m! P(K, m)\right).$$

In order to grasp the complexity of this computation, a communication system having K=24 subchannels and M=10 users, would require O(23,078,555,938) operations to optimally allocate the subchannels. Thus, the strait forward, brute force approach to allocating subchannels is clearly not practical, and another approach to solving this problem is needed.

In one embodiment, the problem of allocating subchannels subject to adjacency and other constraints can be reformulated as a pure binary integer programming problem called the set partitioning problem. The set partition problem has the following generic form:

$$\max_{x} \quad c^T x \qquad (3)$$
$$\text{s.t.} \quad Ax = 1$$
$$x_j \in \{0, 1\} \forall \, j$$

where A is an r×c, c>r matrix of zeros and ones where r=the number of subchannels, K, plus the number of users M, c is a weight vector, and $1=[1, \ldots, 1]^T$ is an c-length vector of ones.

Figure 7:
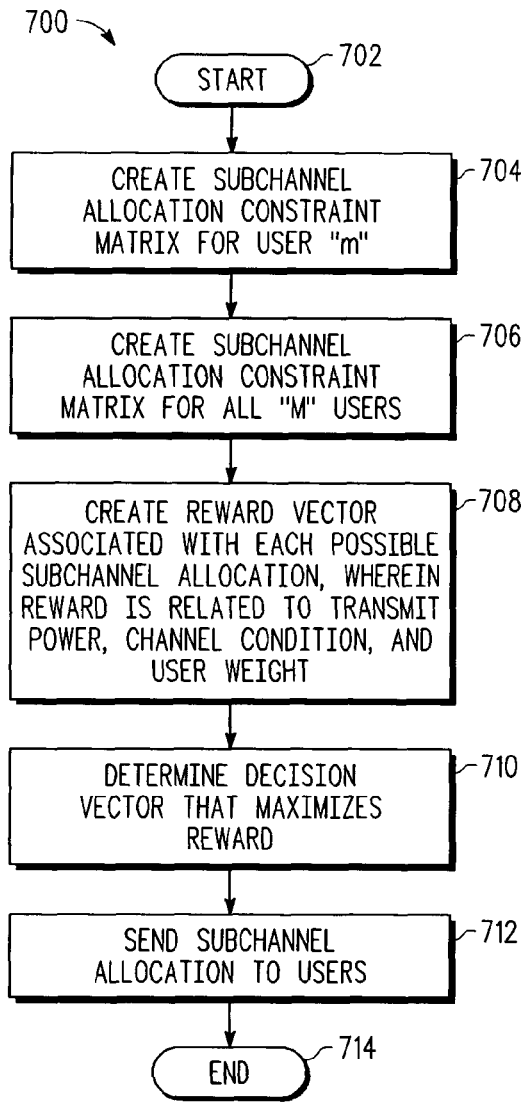
FIG. 7 is a high-level flowchart of processes executed by one embodiment of the resource allocator of FIGS. 1 and 2 in accordance with one or more embodiments.

Referring now to FIG. 7, there is depicted high-level flowchart 700 of processes executed, e.g., by one embodiment of the resource allocator of FIGS. 1 and 2, wherein the process uses binary integer programming in accordance with one or more embodiments. As illustrated, the process begins at 702, and thereafter passes to 704 wherein the process creates a subchannel allocation constraint matrix for user "m". The subchannel allocation constraint matrix, which can be denoted as $A_m$, has rows that correspond to the possible subchannel allocation patterns, and columns that correspond to the subchannel index. A subchannel allocated to the user is denoted by a 1, and a subchannel not allocated to the user is denoted by a zero.

An example of matrix $A_m$ is shown in FIG. 3, for a communications system having K=4 subchannels and M=2 users, wherein matrix $A_m$ 300 has columns 302, 304, 306, 308 that correspond to subchannels 1-4, and rows 310 that correspond to each possible subchannel combination that can be allocated to user m. In a larger system having more subchannels and more users, there can be a relatively small number of feasible subchannel allocations available due to the subchannel adjacency constraint. There are only K−(t−1) possible subchannel allocations when a user is assigned t>0 subchannels. Note that in communication system that imposes the same constraints on all users, matrix $A_m$ 300 is the same for all users. Also note that when multiple subchannels are assigned to a user (e.g., rows 6-11 of matrix $A_m$ 300) the multiple subchannels are adjacent to each other. Thus, the total number of rows 310 in $A_m$ matrix 300 is given as:

$$R = 1 + \sum_{t=1}^{K} (K - (t-1)) = \frac{1}{2}K^2 + \frac{1}{2}K + 1 \qquad (5)$$

In an embodiment using a synchronous hybrid ARQ system, such as the 3GPP-LTE uplink, hybrid ARQ controller 134 constrains matrix $A_m$ 300 for a given user m by forcing it to be exactly the same as it was on an earlier transmission, so there is only one choice for $A_m$ for user m, and consequently only one choice for the reward contribution for user m. In a similar way it is possible to prune the A matrix to take into account other restrictions required by, for example, interference coordination.

After creating the subchannel allocation constraint matrix 300 for a single user, the process creates a subchannel allocation constraint matrix for all M users, as illustrated at 706. This constraint matrix on x (which is denoted as A in equation (3), and which is shown in FIG. 4 as constraint matrix A 400) is constructed to enforce the exclusive subchannel assignment constraint for subchannel k. The exclusive subchannel assignment constraint requires that one and only one subchannel allocation pattern containing a one in the $k^{th}$ column is chosen.

This can be expressed as:

$$\sum_{m=1}^{M} \sum_{j \in \mathcal{J}_{m,k}} x_{m,j} = 1, k = 1, \ldots, K \qquad (7)$$

where $J_{m,k}$ is the set of row indices (e.g., the subchannel allocation patterns 310) that have a 1 in column k of $A_m$ 300. Note that these K constraints can be conveniently written as $[A_1^T, \ldots, A_M^T]x=1$ In addition to these K exclusive subchannel allocation constraints, there must also be M constraints that enforce the rule that one and only one of the patterns (rows) in $A_m$ 300 can be chosen.

This can be expressed as:

$$\sum_{j=1}^{R} x_{m,j} = 1, m = 1, \ldots, M \qquad (8)$$

Equation (8) can similarly been written in matrix form as $I_M \otimes 1_R^T = 1$, where $I_M$ is the identity matrix of size M×M, $1_R$ is the length R vector of ones, and $\otimes$ is the Kronecker product. Therefore, the overall constraint matrix A 400 can be written as:

$$A = \begin{bmatrix} A_1^T & \cdots & A_M^T \\ 1_R^T & \cdots & 0_R^T \\ \vdots & \ddots & \vdots \\ 0_R^T & \cdots & 1_R^T \end{bmatrix} \qquad (9)$$

which has K+M rows, and MR columns.

The overall constraint matrix shown in FIG. 5 is for the example with K=4 subchannels and M=2 users. Note that the top part of the matrix includes transposed constraint matrices $A_m$ for each user 402, 404, and the bottom part of the matrix includes identity matrices 406 and 408.

After creating the overall constraint matrix 400 for all users, the process creates a reward vector associated with each possible subchannel allocation, wherein the reward is related to transmit power, channel condition, and a user weighted Shannon capacity, as illustrated at 708. This reward vector can be denoted as $c_{m,j}$, and is illustrated in FIG. 5 as vector c 500. Each element $c_{m,j}$ 502 indicates the reward or contribution level to the objective when $x_{m,j}$ (i.e., a subchannel allocation configuration for a user m) is chosen (e.g. =1). In one embodiment, the reward is the weighted Shannon capacity assuming constant power allocation for user m when the subchannel allocation j is used. The reward 502 can be expressed as:

$$c_{m,j} = w_m \sum_{k=1}^{K} \log_2\left(1 + A_m(j,k) \min\left(\frac{P_m}{\sum_{l=1}^{K} A_m(j,l)}, \hat{P}_{m,k}\right) \frac{\gamma_{m,k}}{\sigma^2}\right) \qquad (6)$$

where $A_m(j,k)$ denotes the (j,k)th entry of matrix $A_m$. Note that the term inside the summation is zero when $A_m(j,k)=0$.

In other embodiments, the reward constant $c_{m,k}$ can be computed in other ways. For example, $c_{m,k}$ can be computed when incremental power levels are allowed, or when discrete rates or packet sizes are being used.

After creating the reward vector, the process determines a decision vector that maximizes the reward, as illustrated at 710. In a binary decision variable x, which is illustrated in FIG. 6, each possible subchannel allocation for a user m is associated with an element 602 $x_{m,j} \in \{0,1\}$, j=1, ..., R, which indicates whether that particular subchannel allocation is chosen or not. The binary decision vector is denoted as $x=[x_{1,1}, \ldots, x_{m,j}, \ldots, x_{M,R}]^T$, which is of length $$M\left(\frac{1}{2}K^2 + \frac{1}{2}K + 1\right),$$

which has the same dimension as reward vector $c=[c_{1,1}, \ldots, c_{M,R}]^T$.

The objective function that is to be maximized subject to the constraints on x can be simply stated as $f=c^T x$.

Once the problem expressed in equation (2) has been formulated into the generic set partitioning problem shown in equation (3), the set partitioning problem can be solved, as shown at 710, wherein the process determines the decision vector that maximizes the reward. Solving the set partitioning problem can be implemented using one of several efficient algorithms, such as the "bintprog" function that is built-in to the numerical computing environment and programming language known as Matlab, which is created by The MathWorks, Inc. of Natick, Mass., USA. The bintprog function performs a branch-and-bound search procedure, and a linear programming (LP) relaxation in each iteration. Other efficient solvers for these types of problems are also commercially available.

Finally, as shown at 712, the process sends the subchannel allocation to the users so that the users can properly transmit data on the appropriate subchannel combination at the appropriate time. The process of allocating subchannels ends at 714. It should be understood, however, that the process shown in FIG. 7 can be repeatedly executed in order to continually renew the allocation of subchannels to users on a subframe-by-subframe basis.

In numerical experiments, the bintprog routine arrives at an optimal solution within $N_{mjr} \approx 2$-3 major iterations for K=24 subchannels and M=10 users. Since each LP relaxation can be solved using $O((M+K)^2)$ per minor iteration, for which it typically converges in $N_{mnr} \approx 20$-30 iterations, this approach significantly reduces the complexity of finding an optimal subchannel assignment solution compared to the exhaustive, brute force search procedure described above.

In another embodiment, a solution to the subchannels assignment problem can be obtained with a another algorithm that is much less complex, yet still performs almost as well as the binary integer program solution. In one embodiment, such an algorithm can employ a "greedy" heuristic when allocating the subchannels to the users. The greedy heuristic can be based on a "steepest ascent" in the objective function.

Figure 8:
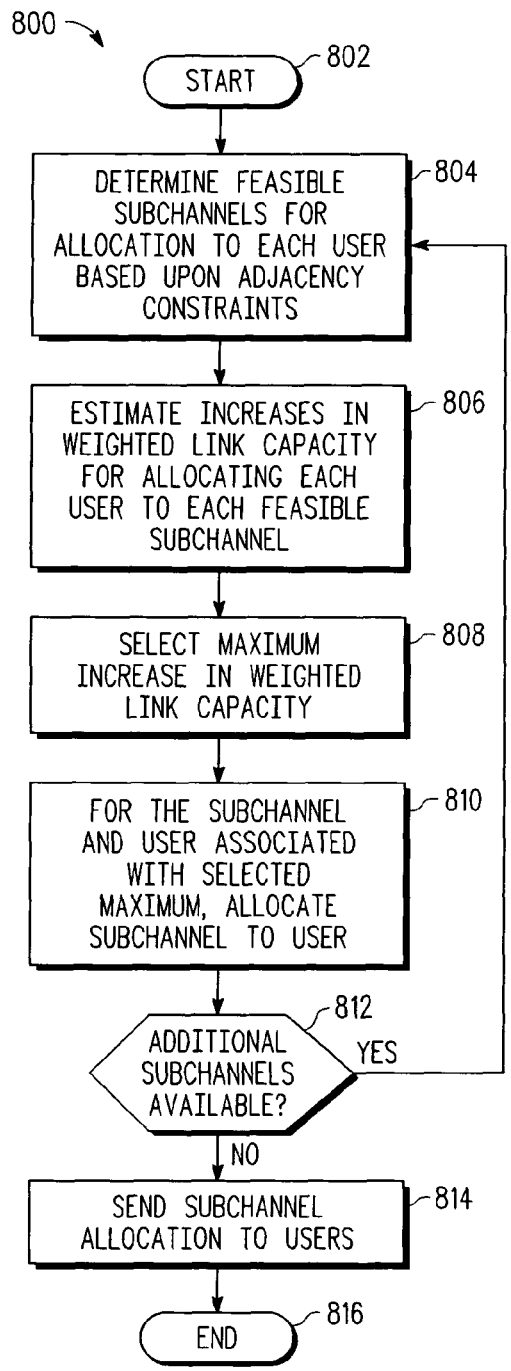
FIG. 8 is a high-level flowchart of processes executed by another embodiment of the resource allocator of FIGS. 1 and 2 in accordance with one or more embodiments.

With reference now to FIG. 8, there is shown a high-level flowchart of processes executed, e.g., by another embodiment of the resource allocator of FIG. 1, in accordance with one or more embodiments. As illustrated, the process, which employs the greedy heuristic, begins at 802, and thereafter passes to 804 wherein the process determines feasible subchannels for assignment of users, e.g., each user, based upon adjacency constraints. Feasible subchannels for assignment to each user m (which can be denoted as $k_m^{(f)}$) are those subchannels that have not been previously assigned to a user, and are those subchannels that are adjacent to any subchannel already assigned to user m, so that the set of feasible subchannels conforms to constraints on resource allocation in the communication system. Note that at initialization, all subchannels are feasible for all users. But once a subchannel is allocated to a user, only the adjacent subchannels to the allocated subchannel are feasible.

Next, the process estimates increases in weighted link capacity for assigning each user m to each subchannel in the set of feasible subchannels $K_m^{(f)}$ for user m, as depicted at 806. The increases in weighted capacity when the considered subchannel k is allocated to user m is given as:

$$\Delta c_{m,k} = \sum_{k' \in K_m \cup k} w_m \log_2\left(1 + \min\left(\frac{P_m}{|K_m|+1}, \hat{P}_{m,k}\right)\frac{\gamma_{m,k'}}{\sigma^2}\right) - \sum_{k' \in K_m} w_m \log_2\left(1 + \min\left(\frac{P_m}{|K_m|}, \hat{P}_{m,k}\right)\frac{\gamma_{m,k'}}{\sigma^2}\right) \quad (11)$$

The estimate of equation (11) is essentially the difference between the resulting weighted capacity when the feasible subchannel k is added to user m (i.e., the first term) and the original capacity without this edition (i.e., the second term).

After calculating weighted estimated capacity increases for all feasible subchannel allocations, the process selects a large, i.e., a maximum, increase in weighted link capacity, as illustrated at 808. Next, for the subchannel and user associated with the selected maximum, the process assigns the selected subchannel to the selected user, as depicted at 810. Thus, the user and subchannel pairing (m*,k*) that results in the largest increase in capacity $\Delta c_{m,k}$ is the winning allocation.

After allocating the maximum subchannel pairing, the process determines whether additional subchannels k are available four assigning to users, as illustrated at 812. If additional subchannels are available, the process iteratively returns to 804 wherein the process determines feasible subchannels for allocation to each user in view of the newly allocated subchannel at 810, and all other previously allocated subchannels.

If there are no additional subchannels available for allocation, the process passes to 814, wherein the subchannel allocation is sent to the users so that each user can schedule its transmission on the allocated subchannels. The process of allocating subchannels to users ends at 816, but may be repeated as needed, e.g., for each subframe.

In each pass or iteration through the process depicted in FIG. 8 exactly one subchannel is assigned to one user, wherein the assignment is determined as the feasible assignment that maximizes the increase in the objective. The objective is increasing the weighted capacity of the communication link including all the K subchannels.

An embodiment of pseudo-code for implementing an algorithm similar to that shown in FIG. 8 is listed in the eleven lines below.

| | |
|---|---|
| Input: | M, K, $\sigma^2$, $\gamma_{m,k}$, $w_m$, $P_m$ |
| Output: | $K_m$, $\forall\, m \in M$ |

| Line | Operation |
|---|---|
| 1 | $K = \{1, \ldots, K\}$ |
| 2 | $K_m = \varnothing$, $\forall\, m \in M$ |
| 3 | $K_m^{(f)} = K$, $\forall\, m \in M$ |
| 4 | while $K \neq \varnothing$ |
| 5 | $\forall\, m \in M$ |
| 6 | $\forall\, k \in K_m^{(f)} \cap K$ |
| 7 | $\Delta c_{m,k} = \sum_{k' \in K_m \cup k} w_m \log_2\left(1 + \min\left(\frac{P_m}{|K_m|+1}, \hat{P}_{m,k}\right)\frac{\gamma_{m,k'}}{\sigma^2}\right) - \sum_{k' \in K_m} w_m \log_2\left(1 + \min\left(\frac{P_m}{|K_m|}, \hat{P}_{m,k}\right)\frac{\gamma_{m,k'}}{\sigma^2}\right)$ |
| 8 | $(m^*, k^*) = \arg\max_{m,k} \Delta c_{m,k}$ |
| 9 | $K_{m^*} = K_{m^*} \cup k^*$ |
| 10 | $K_{m^*}^{(f)} = \{\min(K_{m^*}) - 1, \max(K_{m^*}) + 1\} \cap K$ |
| 11 | $K = K \setminus k^*$ |

The set K (see line 1) indicates the available subchannels to be allocated in each iteration. The algorithm terminates as soon as this set K becomes empty (see line 4). The set $K_m$ (line 2) is the resulting subchannel allocation for each user m, and $k_m^{(f)}$ (line 3) is the set of subchannel indices that are feasible to each user m at each iteration. As subchannels are allocated, $k_m^{(f)}$ is updated accordingly (see line 10). In the main body of the algorithm (lines 4-11), for all the users and for all the subchannel indices that are feasible for that user, the increase in weighted capacity is computed when the considered subchannel is allocated to that user (line 7). The user and subchannel pairing (m*,k*) that results in the largest increase in capacity $\Delta c_{m,k}$ is the winning allocation (see line 8). Sets $K_m$, $k_m^{(f)}$, and K are appropriately updated following the allocation (see lines 9-11).

The complexity of this algorithm is $O(K^2M)$ since there are exactly K iterations, and each iteration requires O(MK) operations to compute equation (11) for all users and subchannels. In some instances the complexity is actually less since the feasible set of subchannels has at most a cardinality of 2 (i.e., the subchannels to the left and to the right of the already allocated subchannels (see line 10)) after each user has been allocated at least one subchannel, thus the amortized capacity when K>>M is just O(MK).

In a MIMO system where multi-user transceiver 102 uses multiple receive antennas 118, 122, the reward calculated for each user and each subchannel is identical to the single antenna case. However, the effective channel used is the effective channel SNR after space-time coding. For example, in the Alamouti code, effective channel seen by each transmitted signal is the Frobenius norm of the channels from each transmit antenna to the receiver given by:

$$\gamma = \frac{|h_1|^2 + |h_2|^2}{N_o} \quad (12)$$

Thus, the reward (refer to equation (6) above), if using the weighted Shannon capacity, becomes:

$$c_{m,j} = w_m \sum_{k=1}^{K} \log_2\left(1 + A_m(j,k)\min\left(\frac{P_m}{\sum_{l=1}^{K} A_m(j,l)}, \hat{P}_{m,k}\right)\gamma_{m,k}\right) \quad (13)$$

where m={1, . . . , M} is the user index, j is the subchannel allocation index, and k={1, . . . , K} is the subchannel index.

In communications systems 100 using pure spatial multiplexing with one user allocated all the streams on a subchannel simultaneously, the reward for each user becomes the sum of the rewards per stream. For example, if the reward is based on the weighted Shannon capacity, $$c_{m,j} = w_m \sum_{n=1}^{N_s} \sum_{k=1}^{K} \log_2\left(1 + A_m(j,k)\min\left(\frac{P_m}{M_t \sum_{l=1}^{K} A_m(j,l)}, \frac{P_{m,k}}{M_t}\right)\gamma_{m,k,n}\right) \quad (14)$$

where n={1, . . . , $N_s$} are the number of streams, $M_t$ is the number of transmit antennas, and $\gamma_{m,k,n}$ is the effective SNR of the $n^{th}$ stream. Note that the effective SNR depends on the type of MIMO spatial multiplexing stream used. This technique can be used with schemes such as Spatial Multiplexing with Horizontal Encoding, Spatial Multiplexing with Vertical Encoding, and Per Antenna Rate Control (PARC).

In a communications system using uplink multiple access MIMO, each MIMO stream is allocated independently to a user. Thus, the scheduler is identical to the single antenna scheduler. As such, if there are $N_a$ allocations in the single antenna case, there will be $N_a \times N_s$ allocations in the uplink multiple access MIMO case. Note that an uplink multiple access MIMO channel between wireless devices is an example of a system that uses a "space-time" channel for data communication, wherein the space-time channel can be a channel where one or more of the communicating wireless devices uses more than one antenna.

The above described functions and structures can be implemented in one or more integrated circuits. For example, many or all of the functions can be implemented in the signal processing circuitry that is suggested by the block diagrams shown in FIGS. 1 and 2.

The processes, apparatus, and systems, discussed above, and the inventive principles thereof are intended to produce an improved and more efficient method and system for allocating communication resources, such as subchannels, in a communication system. By using binary integer processing an advantageous allocation of resources can be achieved in a very efficient manner.

While the embodiments discussed above primarily relate to allocating subchannels and power in a wireless communications system, this system, and processes therein, may be used in other data transmission applications, such as transmitting data via a wireline media, such as a wideband coaxial cable, twisted-pair telephone wire, or the like.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of allocating resources in a communications system comprising: in a processor
   computing a constraint matrix, A, wherein A represents constraints for allocating K subchannels out of the resources in a communications system to M communications links in R allocations of selected k subchannels, wherein the R allocations are constrained by an allocation constraint;
   estimating a vector, c, containing metrics associated with one or more of the resources and corresponding to allocating the R allocations to the M communication links;
   computing a binary decision vector, x, representing an allocation of the K subchannels to the M communications links, wherein x is computed using binary integer processing according to the mathematical expression:

$$\max_x \; c^T x$$

subject to the constraint that $Ax=1$, where $x_j \in \{0,1\} \; \forall j$, wherein A is a matrix of zeros and ones, and $1=[1, \ldots, 1]^T$ is a c-length vector of ones where T indicates the transpose of an associated matrix.

2. The method of allocating resources according to claim 1 wherein the estimating the c vector includes estimating weighted metrics related to a weighted bit rate capacity of the allocation of the R allocations to the M communication links.

3. The method of allocating resources according to claim 1 wherein the estimating the c vector includes estimating weighted metrics related to a channel condition of channels using the R allocations.

4. The method of allocating resources according to claim 1 wherein the estimating the c vector includes estimating weighted metrics related to transmit powers of the M communication links.

5. The method of allocating resources according to claim 1 wherein the M communications links are communication links between an uplink receiver and a user, m, of M users, and wherein the estimating metrics of the c vector includes estimating the vector, c, containing metrics corresponding to allocating the R allocations to the M users.

6. The method of allocating resources according to claim 1 wherein the estimating the c vector includes estimating the c vector according to the formula:

$$c_{m,j} = w_m \sum_{k=1}^{K} \log_2\left(1 + A_m(j,k)\min\left(\frac{P_m}{\sum_{l=1}^{K} A_m(j,l)}, \hat{P}_{m,k}\right)\frac{\gamma_{m,k}}{\sigma^2}\right)$$

wherein $w_m$ is a weight associated with a communication link, m, of the M communication links, and $P_m$ is a total power of the communication link m, and $\hat{P}_{m,k}$ is a power control level for communication link m using a subchannel k of the K subchannels, $\gamma_{m,k}$ is a channel gain and $\sigma^2$ is the ambient noise variance for communication link m using the subchannel k and $A_m(j,k)$ denotes the (j,k)th entry of matrix $A_m$, $A_m$ being matrix A corresponding to communication link m.

7. The method of allocating resources according to claim 1 wherein the estimating the c vector includes estimating metrics related to R allocations using a space-time channel.

8. The method of allocating resources according to claim 1 wherein the computing the constraint matrix, A includes computing a constraint matrix, A, including constraints related to re-allocating, to a communication link m, one or more k subchannels used previously by the communication link m in a transmission that has been rescheduled.

* * * * *